(12) United States Patent
Thibault et al.

(10) Patent No.: US 7,748,689 B2
(45) Date of Patent: Jul. 6, 2010

(54) RADIALLY FLEXIBLE BUSHING

(75) Inventors: Bertrand Thibault, Grand Rapids, MI (US); Bertrand Barrio, Jaboticabal (BR); Fred Stillman, Grand Rapids, MI (US)

(73) Assignee: Paulstra CRC, Grand Rapids, MN (US)

( * ) Notice: Subject to any disclaimer, the term of this patent is extended or adjusted under 35 U.S.C. 154(b) by 546 days.

(21) Appl. No.: 11/276,704

(22) Filed: Mar. 10, 2006

(65) Prior Publication Data

US 2007/0210534 A1 Sep. 13, 2007

(51) Int. Cl.
*F16F 5/00* (2006.01)

(52) U.S. Cl. .............................. 267/140.12; 267/140.4; 267/141.2; 267/153; 267/293

(58) Field of Classification Search ............ 267/140.12, 267/292, 293, 140.3, 140.4, 153, 154, 219, 267/141.2; 384/220, 222; 248/635
See application file for complete search history.

(56) References Cited

U.S. PATENT DOCUMENTS

| 4,392,640 A * | 7/1983 | Kakimoto ................ 267/141.2 |
| 4,667,942 A * | 5/1987 | Bitschkus et al. ...... 267/140.12 |
| 4,717,111 A * | 1/1988 | Saito ...................... 267/140.12 |
| 4,768,760 A * | 9/1988 | Le Fol .................... 267/140.12 |
| 4,817,926 A * | 4/1989 | Schwerdt ............... 267/140.12 |
| 4,951,930 A * | 8/1990 | Uno et al. .................. 267/293 |
| 5,031,885 A * | 7/1991 | Schwerdt ................. 267/141.2 |
| 5,129,479 A * | 7/1992 | Fujii et al. .................. 180/297 |
| 5,718,407 A * | 2/1998 | Lee ........................... 248/634 |
| 6,029,960 A * | 2/2000 | Gab ....................... 267/140.12 |
| 6,068,247 A * | 5/2000 | Rudolph ................. 267/140.12 |
| 6,585,222 B2 * | 7/2003 | Ihara et al. .................. 248/562 |
| 6,845,994 B2 * | 1/2005 | Cai et al. .............. 280/124.107 |

* cited by examiner

*Primary Examiner*—Robert A Siconolfi
*Assistant Examiner*—Mariano Sy
(74) *Attorney, Agent, or Firm*—Marshall, Gerstein & Borun LLP

(57) ABSTRACT

The invention provides for a radially flexible bushing, comprising an outer annular element, an inner rigid element surrounded by the outer element, an elastomer body, which adherently attaches the inner rigid element and the outer element. The elastomer body comprises spaced-apart arms extending radially from the inner rigid element to the outer element. It further comprises at least one radial stop for limiting the radial displacement of the inner rigid element. The radial stop, which is positioned on the outer element between the arms, comprises an arch having extremities joined to the outer element and a top oriented towards the rigid element. The arch defines together with the outer element a tubular cavity.

16 Claims, 3 Drawing Sheets

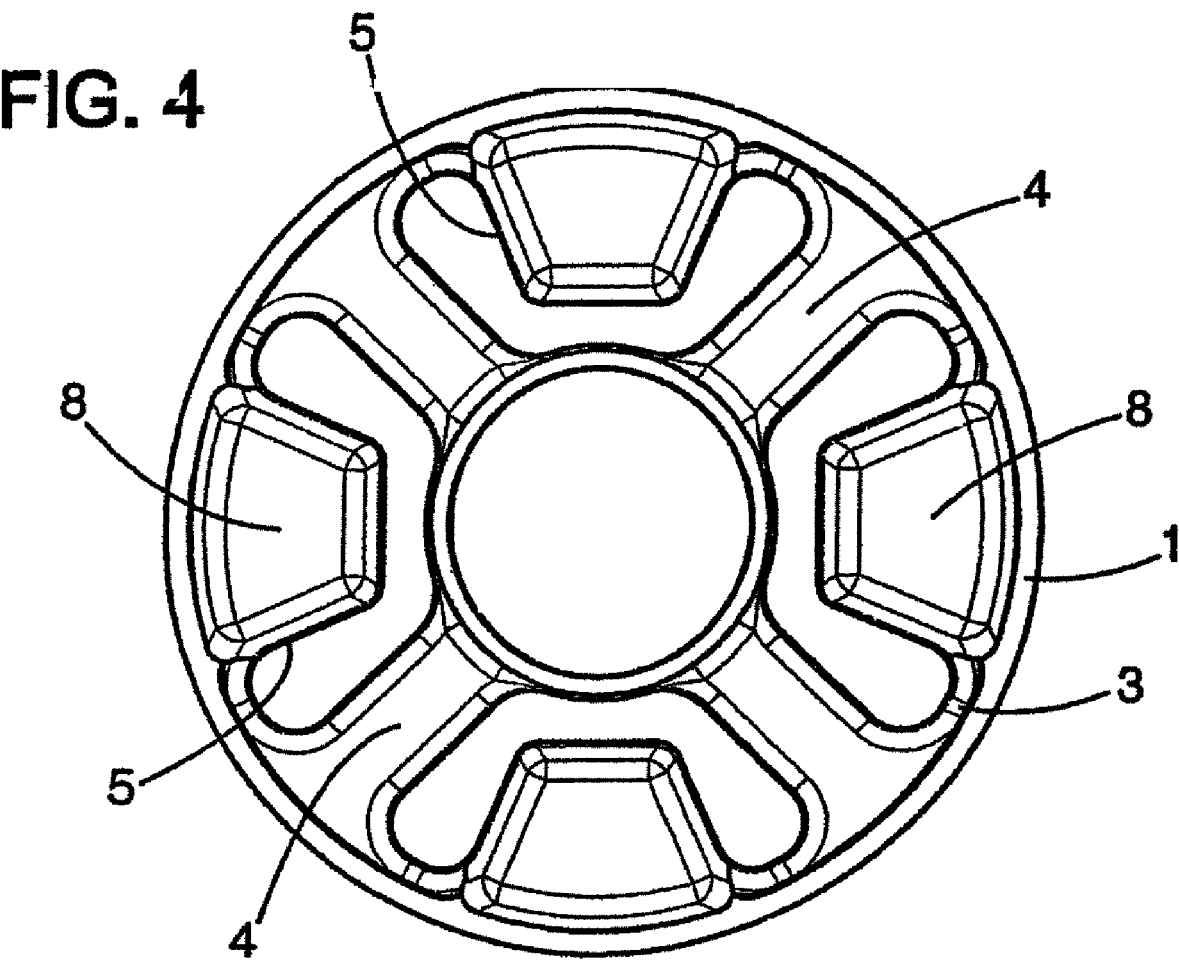

RADIALLY FLEXIBLE BUSHING

FIELD OF THE INVENTION

The present invention relates to radially flexible bushings intended to be interposed for linking and damping purposes between two rigid elements such as a transmission box and its supporting chassis.

More particularly, amongst such devices, the invention relates to those which comprise:
- an outer annular element, defining a central axis,
- an inner rigid element surrounded by said outer element,
- an elastomer body, which adherently attaches the outer periphery of said inner rigid element and said outer element, said elastomer body comprising a plurality of spaced-apart arms extending radially from said inner rigid element to said outer element, and
- at least one radial stop for limiting the radial displacement of said inner rigid element.

BACKGROUND OF THE INVENTION

Such radial bushings are already known in the prior art.

A particular object of the present invention is to further improve such bushings.

To this end, according to the invention, in a radial bushing of the kind in question, said radial stop is positioned on said outer element between said arms, and comprises an arch having extremities joined to said outer element and a top oriented towards said rigid element, said arch defining with said outer element a tubular cavity.

By means of these dispositions, the operating life and performance of such bushings is increased.

In preferred embodiments, it is possible to use one or more of the following dispositions:
- the arch is integrally formed with the outer element, and preferably extends in a substantially parallel direction to the central axis;
- the arch is substantially shaped in the form of a shape selected from the group consisting of: triangular shaped, trapezoidal shaped, rectangular shaped, arc shaped; said arch further comprising an axe of symmetry oriented towards the rigid element;
- the tubular cavity is filled with an elastomer;
- the elastomer filing the tubular cavity is integrally formed with the elastomer body forming the elastomer arms;
- the arch has a cut-out therein allowing elastomer in the tubular cavity to connect with the elastomer body;
- the elastomer filling the tubular cavity is of different properties than the elastomer constituting the elastomer arms;
- the a least one radial stop is also constructed as an axial stop by protruding elastomer axially from the tubular cavity;
- the outer annular element is made from a material selected from the group consisting of: synthetic compound, fibreglass, fibreglass reinforced plastic, metallic compound (especially aluminium);
- a plurality of radial stops, each comprising an arch, are provided;
- at least two of the arches are of different shape;
- the radial stops exhibit different radial stiffness.

A further advantage of this invention is that less material is needed to manufacture such a device, therefore they are cheaper to produce.

Besides, another object of the present invention is a method of manufacturing a radially flexible bushing including an inner rigid element surrounded the steps of:

- molding the outer annular element together with at least one arch having extremities joined to said outer element and a top oriented towards said inner rigid element, said arch defining with said outer element a tubular cavity,
- molding an elastomer body which adherently attaches the inner periphery of said outer element, said elastomer body comprising a plurality of spaced-apart arms extending radially from said inner rigid element to said outer element, and
- placing said inner element such that the elastomer arms attach said inner element and such that the arch provides at least one radial stop, positioned on the annular element between said arms, for limiting the radial displacement of said inner rigid element.

In a variant of the above method:
- said outer element and said elastomer body are bi-injection molded, the bi-injection steps comprising:
  (a) a first step of injecting a first material, thereby creating said outer annular element and said at least one arch, and
  (b) a second step of injecting a second material, thereby creating said elastomer body;
- said inner rigid element is inserted inside said elastomer body, thereby radially pre-compressing said elastomer arms;
- said tubular cavity is filled in the same operation as used to mold said elastomer arms;
- said tubular cavity is filled in a subsequent operation as used to mold said elastomer arms;
- wherein axial stops are extruded in elastomer from the tubular cavity, in the same operation as when said tubular cavity is filled.

These dispositions lead to a device with lower inherent operating stresses and therefore longer fatigue life, and in particular to one with no localised high stress zones during normal operating modes.

BRIEF DESCRIPTION OF THE DRAWINGS

Other characteristics and advantages of the invention appear from the following detailed description of two embodiments thereof, given as non limitative examples and with reference to the accompanying drawings, in which:

FIG. 4 is plan view of a first embodiment of the invention, shown without the inner rigid element inserted.

DETAILED DESCRIPTION

In the various figures, the same references designate elements that are identical or similar.

Figure 1:
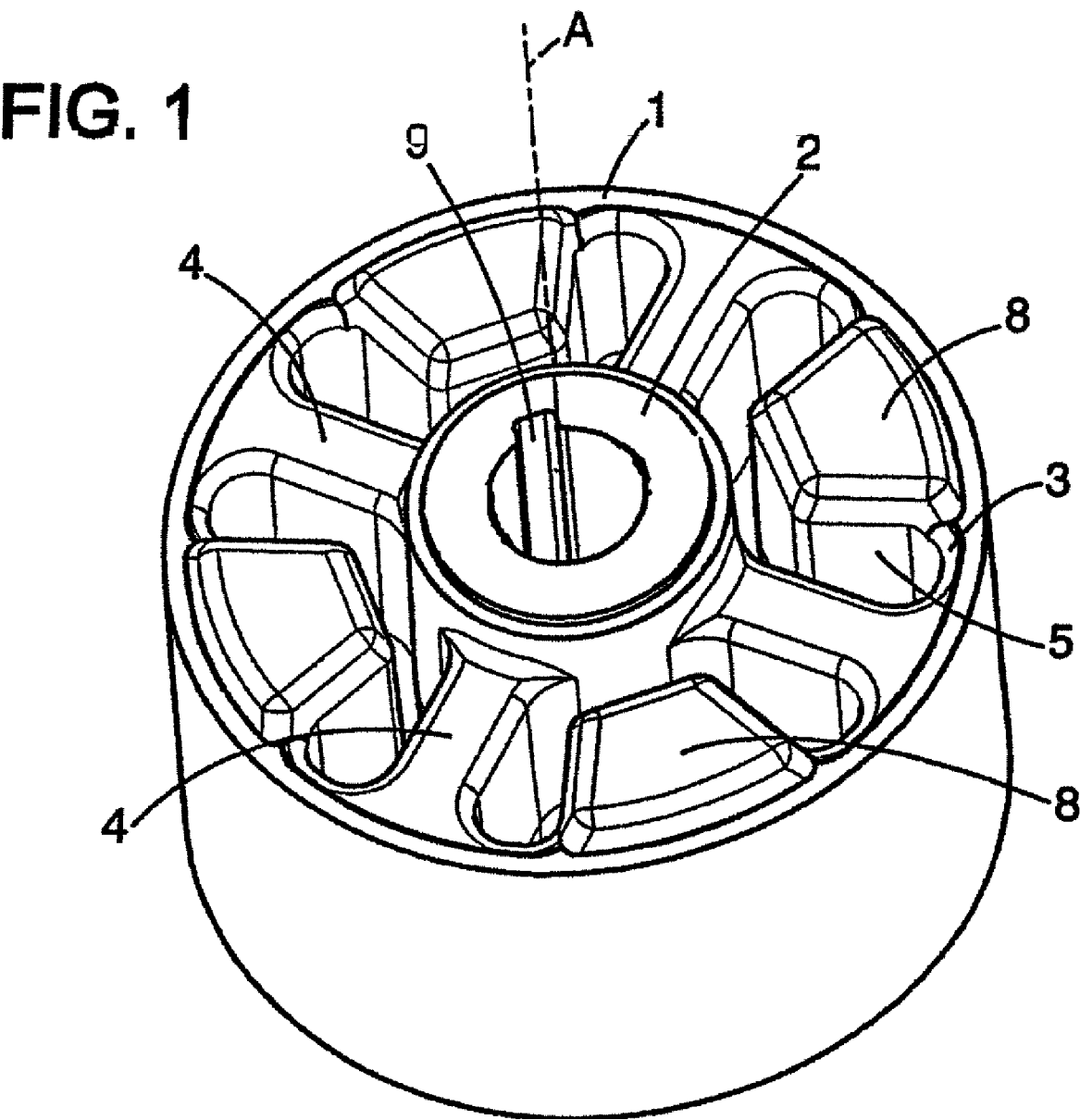
FIG. 1 is a three dimensional view of a radially flexible bushing according to a first preferred embodiment of the invention.

The radially flexible bushing shown in FIG. 1 comprises an outer annular element 1, defining a central axis A, and a hollow inner rigid element 2, the inner rigid element 2 being surrounded by the outer element 1. Both the outer annular element 1 and the inner ridge element 2 are predisposed to be adapted to, or be attached to external bodies. The bushing serves to limit radial, and possibly axial, movement between the said external bodies, and provide a given rigidity once contact is made by the inner rigid element 2 to radial stops 5. Depending on the disposition of the embodiment, the rigidity can be of different values in different radial directions.

In this particular embodiment shown here, the inner rigid element 2 takes the form of a metallic cylinder (or other similarly rigid materials). A key 9 is provided therein to allow a locking mechanism between one of the external bodies to prevent rotational slip therebetween. The key 9 consists of a groove extending sensibly parallel to the central axis of the inner rigid element 2, and along the interior peripheral surface of the inner rigid element.

The outer annular element 1 is a thin-walled, longitudinally extending cylindrical construction made of a moderately deformable material such as Nylon, another synthetic compound, a fibreglass, or a fibreglass reinforced plastic. However, a rigid material such as a metallic compound, and especially aluminium, may be used in some circumstances. These are detailed here later.

Both the inner rigid element 2 and the outer annular element 1 extend in a substantially parallel direction as defined by a central axis A.

An elastomer body 3 adherently attaches and radially envelops in a thin layer the outer peripheral surface of the inner rigid element 2 and the inner peripheral surface of the outer annular element 1. There between, are disposed four spaced-apart elastomer arms 4 extending radially from the inner element 2 to the outer element 1. The elastomer may in particular be natural rubber, Vegaprene®, or other similarly flexible materials.

In equal numbers, and positioned on said outer element 1 mid-way between each of the elastomer arms 4, are four radial stops 5 for limiting the radial displacement of the inner rigid element 2. Each radial stop 5 is substantially trapezoidal shaped, and comprises an axis of symmetry pointing in the direction of the inner rigid element 2. Although not represented here, the innermost portion of the radial stop 5 destined to come into contact with the inner rigid element 2 when subjected to radial forces may be shaped so as to complement the form of the inner rigid element 2. Of course, the radial stops are not limited to a trapezoidal shape, and may take a triangular, rectangular or circular shape, or indeed any other non-regular shape. Furthermore, each of the radial stops may have a different shape, the shapes adapted to limit radial displacement of the inner element 2 or produce certain stiffness characteristic once contact between the radial stop 5 and the inner element 2 is made, for example. Equally, there need not be a symmetry in the shape of the radial stop 5 as long as the fundamental function of the stop, to constrain movement of the inner rigid element 2, is still exhibited.

Under radial forces the inner rigid element 2 will be displaced in a radial direction. This displacement will at first be mostly linear with a first stiffness characteristic corresponding to the stiffness of the elastomer arms 4, and once contact is made between the inner rigid element 2 and the radial stop 5, with a second stiffness characteristic corresponding to the stiffness of the radial stops 5 and the elastomer contained therein. On contact, the increased radial stiffness of the radial stops 5 will in a large part limit movement of the inner rigid element 2.

Additionally, the embodiment represented may also further comprise axial stops 8. These axial stops are formed by protruding a volume of elastomer longitudinally past, and in either longitudinal direction of, the outer element 1. This disposition permits the axial stops 8 to, under axial forces such that the central rigid element 2 is displaced axially with respect to the outer element 1, contact an external body, thereby dampening and limiting the movement of the bushing. As the axial stops 8 may be of different dimensions and composition on either side of the bushing, this leads to two independent tuneable directions on the longitudinal axis.

Figure 2:
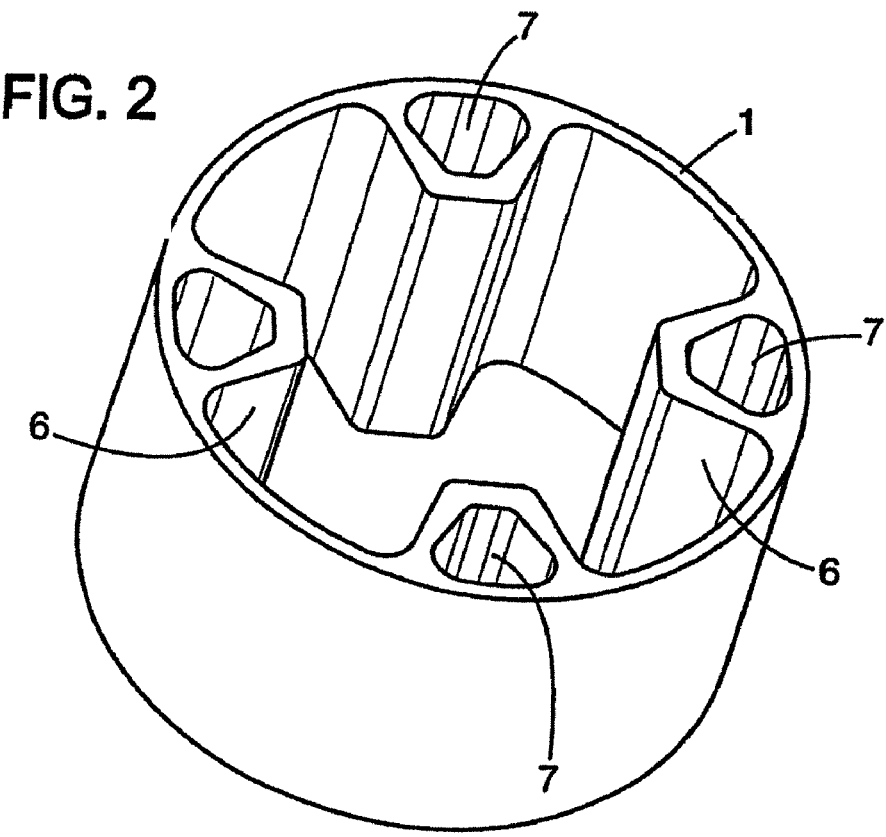
FIG. 2 is three dimensional view of the outer annular element, according to a first embodiment of the invention.

The construction of the radial stops 5 can more easily be seen in FIG. 2. As represented, the radial stops 5 comprise an arch 6 having extremities joined to the outer element 1 and a top oriented towards the rigid element 2, the arch 6 defining together with the outer element 1 a tubular cavity 7. The tubular cavity 7 preferably extends in a substantially parallel direction to the central axis A, i.e. in a direction collinear with the longitudinal axis of the outer element 1. However, the tubular cavity 7 may deviate from this longitudinal orientation, especially if the radial stops 5 are mechanically or adhesively joined to the outer element 1. The arches 6 as represented in the embodiment in question are integrally formed with the outer annular element 1, nevertheless any method that joins the arches 6 to the outer element 1, such as by mechanical interconnection, welding, or adhesive may be used.

Depending on the performance characteristics required, the tubular cavities 7 may remain void of matter, or may be filled with an elastomer. If the performance aim of the radial flexible bushing warrants it, then each of these said tubular cavities 7 may be filled with elastomer of different properties, such that a different radial (or axial) rigidity can be exhibited in each of the radial (or axial) directions containing a radial stop 5. This leads to four independently tuneable orthogonal directions in the radial directions (and tuneable axial directions).

Figure 3:
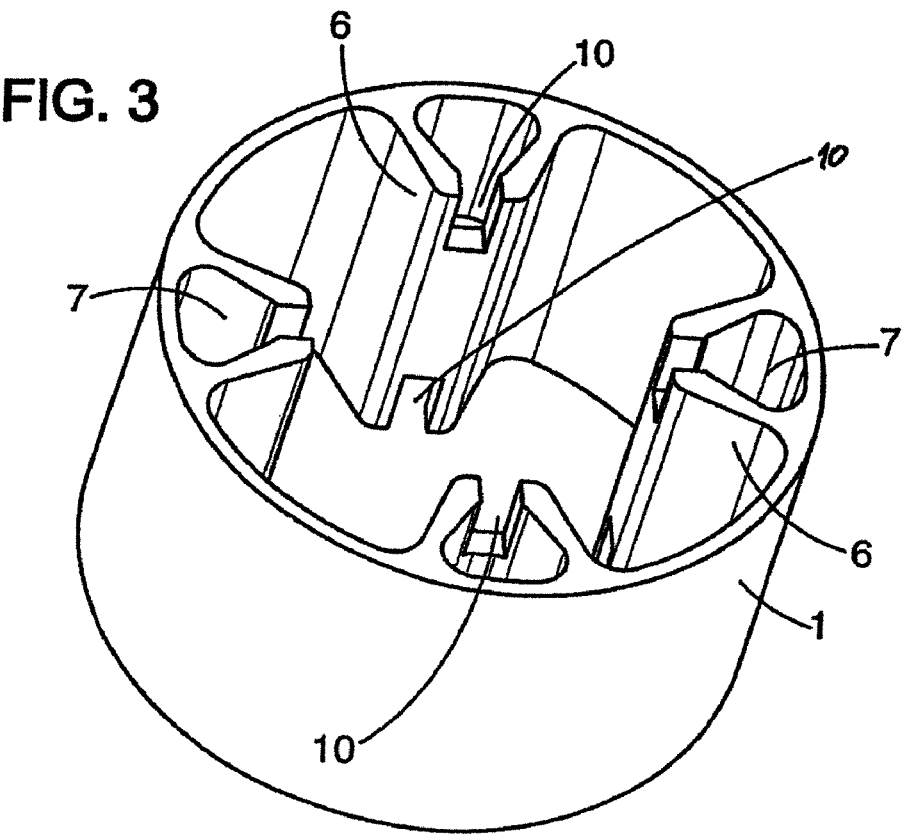
FIG. 3 is a similar view to FIG. 3, showing a second embodiment thereof.

In yet a further embodiment of the present invention, and as illustrated in FIG. 3, the radial stops 5 may also further comprise cut-outs 10 in the arch walls 6, thereby allowing elastomer in said tubular cavity 7 to connect with said elastomer body 3. The elastomer filling the tubular cavities 7 would then be integrally formed with the elastomer body 3 forming the elastomer arms 4, and would therefore be predisposed to be filled in one operation when molding the elastomer body 3. The longitudinally extending cut-outs 10 may be placed anywhere on the arch walls 6, but are preferentially located on the innermost wall relative to the inner rigid element 2. These cut-outs 10 are designed to have no significant performance impact on the invention in question, but serve to ease the manufacturing operation, and in particular the filling of the tubular cavities 7 with elastomer.

These dispositions lead to a multi-axes fully tuneable bushing as we are able to control the stiffness and displacement for each of the three principal orthogonal axes (in the two radial directions and in the longitudinal direction along the central axis) according to the orientation of the displacement for each of these axes, thus leading to 6 independent tuneable directions.

A method of manufacturing a radially flexible bushing will be detailed below.

The method comprises the steps of:
molding the outer annular element 1 comprising arches 6 having extremities joined to the outer element 1 and a top oriented towards the inner rigid element 2. The arches 6 define together with the outer element 1 tubular cavities 7, and said arches 6 also providing at least one radial stop 5, positioned on the annular element 1 between the elastomer arms 4, for limiting the radial displacement of the inner rigid element 2,
molding the elastomer body 3 which adherently attaches the inner periphery of the outer element 1. The elastomer body 3 comprises a plurality of spaced-apart arms 4 extending radially from the inner rigid element 2 to the outer element 1,
placing the inner element 2 such that the elastomer arms 4 attach the outer periphery of the inner element 2.

The outer element 1 and the elastomer body 3 would preferentially be bi-injection molded. Bi-injection molding is a molding operation whereby a first element is molded in a first partial mold, and a second element is molded in the same partial mold as the first molding. Bi-injection molding has the characteristic of being able to mold an element containing two injection steps in the same machine and using at least the same partial molds.

The bi-injection steps for the present embodiment comprise:
- a first step of injecting a first material in a first mold, thereby creating said outer annular element 1 and said at least one arch 6, and
- a second step of injecting a second material in a second mold comprising at least a part of the first mold and containing the outer annular element 1, thereby creating the elastomer body 3.

There exists two methods of assembling the bushing:

1) the first, whereby the outer element 1 and the elastomer body 3 are molded in a first operation, and subsequently the inner rigid element 2 is adherently placed by insertion inside the elastomer body 3, thereby radially pre-compressing the elastomer arms 4;

2) the second, whereby the inner rigid element 2 is placed in the mold prior to molding the outer element 1 and the elastomer body 3. The inner rigid element 2 is thus retained by the elastomer body 3 in the molding process.

Typically the inner rigid element 2 is placed into the mold prior to the molding operation and becomes retained inside of the bushing by the molding process (second method above).

In operation, however, it is desirable for the elastomer body 3 to be in precompression. It is known in the art that rubber that is operated in compression conditions will have a longer fatigue life than rubber that is operated in tension conditions. It is thus important to have the bushing in precompression in order to improve the bushing's fatigue life. It is for this reason that we attempt to precompress the elastomer body 3 in the present invention. To achieve this, one can either:

insert the inner rigid element 2 into the molded elastomer body 3 (thereby precompressing the elastomer arms 4 from the inside out), or compress the outer element 1, such as when the bushing is inserted inside an external body (thereby precompressing the elastomer arms 4 from the outside in).

The first molding method may be accomplished by utilizing a second inner element (not shown) which is preferably the same material as the outer element 1. This would allow the second inner element to be molded together with the outer element 1 in the same molding step. This would then be followed by molding the elastomer body 3 between the second inner element and the outer element 1. The molded bushing would then be removed from the mold and in a separate later operation the inner rigid element 2 could be inserted into the second inner element using an interference fit to expand the second inner element thereby precompressing the elastomer body 3 from the inside outward.

The most desirable method, however, is of precompression via the outer element 1. The precompression of this part occurs when the bushing is placed into a support bracket of an external body (not shown) which has an inner diameter smaller than the outer diameter of the outer element 1. This interference on the outside of the part forces a precompression of the bushing's elastomer body 3 since the outer diameter of the bushing is being forced inward during the insertion into the smaller diameter external body (not shown).

In the case where the chosen precompression method leads to the inward compression of the outer element 1 (the second alternative), then it is desirable for the outer element 1 to be made up of a deformable material, such as a synthetic compound, fibreglass, fibreglass reinforced plastic, or similar.

However, if precompression is achieved by the insertion of the inner rigid element 2, the outer element 1 is able to be formed from a deformable material, but also, preferably, by a rigid element, such as a metallic compound, and aluminium in particular.

As detailed above, the tubular cavity 7 may either remain void of matter, or may be filled with elastomer, but does not create a significant variation of thickness of the outer element 1. However, in the case where cut-outs 10 are provided in the arches 6, then the filling of the tubular cavity 7 will be achieved simultaneously as the molding of the elastomer body 3.

In the case where there are no cut-outs 10 provided and the arches 6 therefore effectively seal the tubular cavity 7 from the elastomer body 3, a subsequent (or a concurrent bi-injection) operation would be performed to fill said tubular cavity 7. This being the case, the elastomer inserted can be chosen independently for each radial stop 5, thereby giving the opportunity of varying the stiffness in each of the radial directions.

Axial stops 8 may be protruded in a longitudinal direction from the radial stop 5, and more specifically the tubular cavity 7, at any point, but would preferentially be completed posterior to filling the tubular cavities 7, thereby allowing the elastomer filling said tubular cavity 7 to form the axial limitation.

The axial stops 8, will obviously have a stiffness characteristic dependent on the elastomer filling said tubular cavity 7, thus providing a way of tuning the axial stiffness of the bushing.

As will be appreciated, the present invention does not limit itself to the embodiments described hereabove purely as examples; the invention also extends to other embodiments.

The invention claimed is:

1. A radially flexible bushing, comprising:
   an outer annular element, defining a central axis,
   an inner rigid element surrounded by said outer element, and
   an elastomer body, which adherently attaches to an outer periphery of said inner rigid element and to said outer element, said elastomer body comprising a plurality of spaced-apart arms extending radially from said inner rigid element to said outer element,
   at least one radial stop for limiting the radial displacement of said inner rigid element, the radial stop formed integrally with and of the same material as the outer annular element, said material being different than that of the elastomer body,
   wherein
   said radial stop is positioned on said outer element between said arms and comprises an arch having extremities joined to said outer element and a top oriented towards said rigid element, said arch defining with said outer element a tubular cavity.

2. A bushing according claim 1, wherein said arch is substantially shaped in the form of a shape selected from the group consisting of: triangular shaped, trapezoidal shaped, rectangular shaped, arc shaped; said arch further comprising an axis of symmetry oriented towards said rigid element.

3. A bushing according to claim 1, wherein said tubular cavity is filled with an elastomer.

4. A bushing according to claim 3, wherein said elastomer filling said tubular cavity is integrally formed with said elastomer body forming said elastomer arms.

5. A bushing according to claim 4, wherein said arch has a cut-out therein allowing elastomer in said tubular cavity to connect with said elastomer body.

6. A bushing according to claim 3, wherein said elastomer filling said tubular cavity has different properties than the elastomer constituting said elastomer arms.

7. A bushing according to claim 1, wherein said at least one radial stop is also constructed as an axial stop by protruding elastomer axially from said tubular cavity.

8. A bushing according to claim 1, wherein said outer annular element is made from a material selected from the group consisting of: synthetic compound, fiberglass, fiberglass reinforced plastic, and metallic compound.

9. A bushing according to claim 1, wherein a plurality of radial stops, each comprising an arch, are provided.

10. A bushing according to claim 9, wherein at least two of said arches are of different shape.

11. A bushing according to claims 9, wherein said radial stops exhibit different radial stiffness.

12. A bushing according to claim 8, wherein the metallic compound is aluminum.

13. The radially flexible bushing of claim 1,
    wherein the material of the outer element and the radial stops has a first stiffness characteristic,
    the elastomer body is formed of a second material having a second stiffness characteristic, and
    the first stiffness characteristic is stiffer than the second stiffness characteristic.

14. The radially flexible bushing of claim 1, wherein the at least one radial stop includes a cut-out, and the elastomer body extends through the cut-out and fills the tubular cavity.

15. A radially flexible bushing, comprising:
    an annular outer element defining a central axis;
    an inner element surrounded by the outer element and disposed along the central axis;
    a plurality of radial stops integrally formed with the outer element, the radial stops protruding inwardly from an inner surface of the outer element toward the inner element; and
    an elastomer body adhered to an outer periphery of the inner element and having a plurality of arms extending to an inner periphery of the outer element,
    wherein the outer element and the radial stops are formed of a first material having a first stiffness characteristic,
    the elastomer body is formed of a second material having a second stiffness characteristic,
    wherein the first stiffness characteristic is stiffer than the second stiffness characteristic;
    wherein the radial stops each comprise a tubular cavity; and
    wherein the elastomer body extends longitudinally outward from the tubular cavity and beyond the outer element to form an axial stop.

16. A radially flexible bushing, comprising:
    an annular outer element defining a central axis;
    an inner element surrounded by the outer element and disposed along the central axis;
    a plurality of radial stops integrally formed with the outer element, the radial stops protruding inwardly from an inner surface of the outer element toward the inner element; and
    an elastomer body adhered to an outer periphery of the inner element and having a plurality of arms extending to an inner periphery of the outer element,
    wherein the outer element and the radial stops are formed of a first material having a first stiffness characteristic,
    the elastomer body is formed of a second material having a second stiffness characteristic,
    the first stiffness characteristic is stiffer than the second stiffness characteristic; and
    further comprising axial stops protruding longitudinally outward from the outer element.

* * * * *